United States Patent
Wendel

(10) Patent No.: US 8,643,542 B2
(45) Date of Patent: Feb. 4, 2014

(54) METHOD FOR SELF-CALIBRATION OF FREQUENCY OFFSETS

(75) Inventor: Jan Wendel, Munich (DE)

(73) Assignee: Astrium GmbH, Taufkirchen (DE)

( * ) Notice: Subject to any disclaimer, the term of this patent is extended or adjusted under 35 U.S.C. 154(b) by 273 days.

(21) Appl. No.: 13/014,355

(22) Filed: Jan. 26, 2011

(65) Prior Publication Data

US 2011/0187594 A1 Aug. 4, 2011

(30) Foreign Application Priority Data

Feb. 4, 2010 (EP) ..................................... 10001162

(51) Int. Cl.
*G01S 19/23* (2010.01)

(52) U.S. Cl.
USPC ...................................................... 342/357.62

(58) Field of Classification Search
USPC ............................ 342/357.62, 357.78, 357.59
See application file for complete search history.

(56) References Cited

U.S. PATENT DOCUMENTS

| | | | | |
|---|---|---|---|---|
| 6,661,371 B2 * | 12/2003 | King et al. | ............... | 342/357.62 |
| 7,535,418 B2 * | 5/2009 | Mizuochi et al. | ........ | 342/357.68 |

| | | | |
|---|---|---|---|
| 2002/0005802 A1 | 1/2002 | Bryant et al. | |
| 2008/0158050 A1 | 7/2008 | Levy | |
| 2009/0153398 A1 | 6/2009 | Hani et al. | |
| 2009/0262018 A1 | 10/2009 | Vasilyev et al. | |

FOREIGN PATENT DOCUMENTS

| | | |
|---|---|---|
| EP | 2 120 061 A1 | 11/2009 |
| WO | WO 2009/140768 A1 | 11/2009 |

OTHER PUBLICATIONS

European Search Report dated Jun. 25, 2010 (Seven (7) pages).

* cited by examiner

*Primary Examiner* — Cassie Galt
(74) *Attorney, Agent, or Firm* — Crowell & Moring LLP

(57) ABSTRACT

A method for self-calibration of frequency offsets in a measurement equipment of an interference monitoring system is provided. The method involves sampling I/Q data using the interference monitoring system measurement equipment and acquiring satellite navigation signals from the I/Q data. A carrier frequency of the satellite navigation signal is estimated and an expected carrier frequency of the satellite navigation signal is calculated. The expected carrier frequency of the satellite navigation signal is compared with the estimated carrier frequency of the satellite navigation signal and a frequency offset value is calculated as the difference between the expected and estimated carrier frequencies of the satellite navigation signal. The frequency offset value is stored in a memory and used to compensate the frequency offset of at least one subsequent measurement.

13 Claims, 1 Drawing Sheet

METHOD FOR SELF-CALIBRATION OF FREQUENCY OFFSETS

CROSS REFERENCE TO RELATED APPLICATIONS

This application claims priority under 35 U.S.C. §119 to European Patent Application No. EP 10 001 162.6, filed Feb. 4, 2010, the entire disclosure of which are herein expressly incorporated by reference.

BACKGROUND AND SUMMARY OF THE INVENTION

The present invention is directed to a method for self-calibration of frequency offsets in measurement equipment of an interference monitoring system. It is also directed to a self-calibrating device and an interference monitoring system.

Radio frequency interference (RFI) presents a serious threat for radio navigation systems and their augmentation systems like GPS, Galileo, EGNOS, WAAS, etc. Therefore, a continuous monitoring of the RFI environment is necessary to protect these systems and to generate situational awareness regarding possible system performance degradations caused by RFI.

FIG. 1 illustrates a conventional measurement chain applied in a sensing site of an interference monitoring system. This known measurement chain includes one or more antennas, a radio frequency (RF) front end and measurement equipment, such as signal analyzers and/or a combination of downconverters, analog/digital (A/D) converters and samplers. This equipment is typically remotely operated in order to avoid frequent site visits.

The measurement equipment makes use of an external or internal reference frequency source, e.g. a quartz oscillator. Such a quartz oscillator is susceptible to aging, so that the reference frequency provided by this device drifts away from its nominal value with time. This causes frequency offsets in the measurements provided by the measurement equipment. Therefore, this measurement equipment needs to be calibrated at regular intervals. It is therefore desired, to have such measurement equipment equipped with a self-calibration capability in order to avoid site visits for calibration purposes.

Calibration of measurement equipment such as signal analyzers is usually performed by the equipment manufacturer. In the context of interference monitoring this requires that either the equipment is shipped to the manufacturer for calibration, or that qualified personnel calibrate the equipment on site. Both approaches have drawbacks regarding interference monitoring system downtimes and costs.

Exemplary embodiments of the present invention provide a method for self-calibration of frequency offsets in measurement equipment of an interference monitoring system. Exemplary embodiments of the invention also provide a self-calibrating device employing such a method and an interference monitoring system with such a self-calibrating device. The self-calibrating device can employ the method by executing instructions stored in a non-transitory computer-readable medium.

An exemplary method of the present invention comprises the steps of:
  a) sampling I/Q data by using the interference monitoring system measurement equipment;
  b) acquiring navigation signals from the I/Q data;
  c) estimating the satellite signal's carrier frequency;
  d) calculating an expected satellite signal's carrier frequency;
  e) comparing the expected satellite signal's carrier frequency with the estimated satellite signal's carrier frequency and calculating a frequency offset value as the difference between the two frequencies;
  f) storing the frequency offset value in a memory; and
  g) using the stored frequency offset value to compensate the frequency offset of at least one measurement in the future.

Thus, the invention involves a method that allows for a self-calibration of frequency offsets in the measurement equipment of an interference monitoring system.

The self-calibration method according to the invention involves sampling I/Q data using the interference monitoring system measurement equipment, to acquire signals from navigation satellites contained in this I/Q data, and to compare the estimated carrier frequencies of the navigation satellite signals with the corresponding expected carrier frequencies, which are calculated from satellite orbit data and the measurement equipment antenna position. The difference between estimated and expected carrier frequency equals the frequency offset of the measurement equipment at the expected carrier frequency, and allows compensation of the frequency offset for subsequent measurements.

In an advantageous modification of the inventive method the acquisition of navigation signals in step b) is carried out by correlating the sampled I/Q data with appropriate replica signals of different code phases and carrier frequencies.

In another advantageous embodiment of the inventive method the step of estimating the satellite signal's carrier frequency the satellite visibility is calculated from known ephemeris or almanac data.

The expected satellite signal's carrier frequency can be calculated from the position of the antenna of the measurement equipment, the satellite position and the satellite velocity.

In a further advantageous development of the inventive method the acquisition of the navigation signals from the I/Q data in step b) is carried out in two sub-steps:
  b1) carrying out a coarse acquisition sub-step first and
  b2) carrying out a refinement acquisition sub-step thereafter.

An acquisition technique can be applied in the refinement acquisition sub-step with narrow frequency bins.

Alternatively, the I/Q data sampled in step a) are processed in the refinement acquisition sub-step in a tracking loop implementation initialized from the results of the coarse acquisition in sub-step b1).

It is advantageous to calculate the frequency offset value at more than one frequencies of interest.

The invention is also directed to a self-calibrating device which is adapted to carry out the steps described above.

Furthermore, the invention is directed to an interference monitoring system comprising measurement equipment provided with a self-calibrating device.

Other objects, advantages and novel features of the present invention will become apparent from the following detailed description of one or more preferred embodiments when considered in conjunction with the accompanying drawings.

BRIEF DESCRIPTION OF THE DRAWINGS

Preferred embodiments of the present invention will now be described with reference to the drawings, in which.

DETAILED DESCRIPTIONS OF THE DRAWINGS

Figure 1:
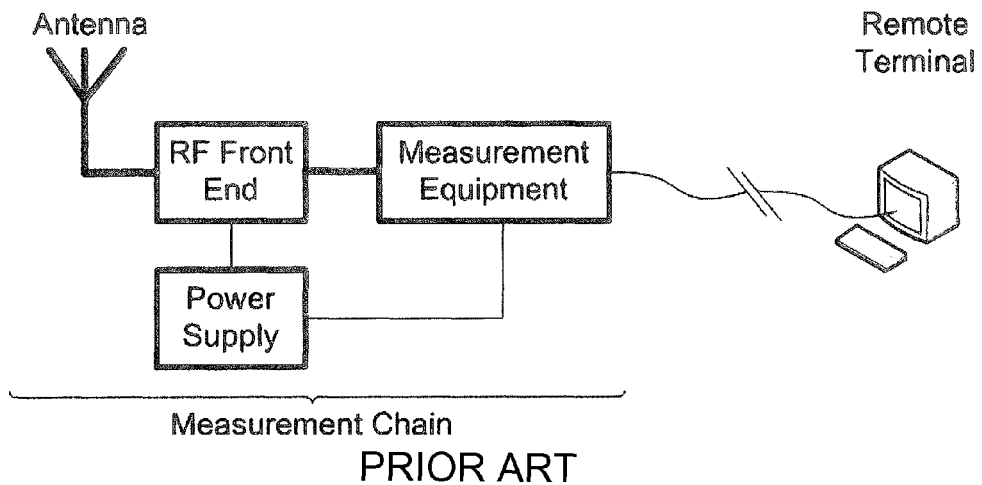
FIG. 1 illustrates a conventional measurement chain applied in a sensing site of an interference monitoring system.

The measurement chain shown in FIG. 1 is, in principle, similar to the interference monitoring system of the present invention. However, in order to implement the invention it is required that the RF front end of the measurement chain contains appropriate bandpass filters and low noise amplifiers, so that this RF front end could also be used as a front end for a global navigation satellite signal (GNSS) receiver. The measurement chain antenna position has to be known, and current GNSS almanac or ephemeris data must be available, e.g. from the internet. The pseudo random noise codes (PRN codes) of GNSS signals are also required.

Figure 2:
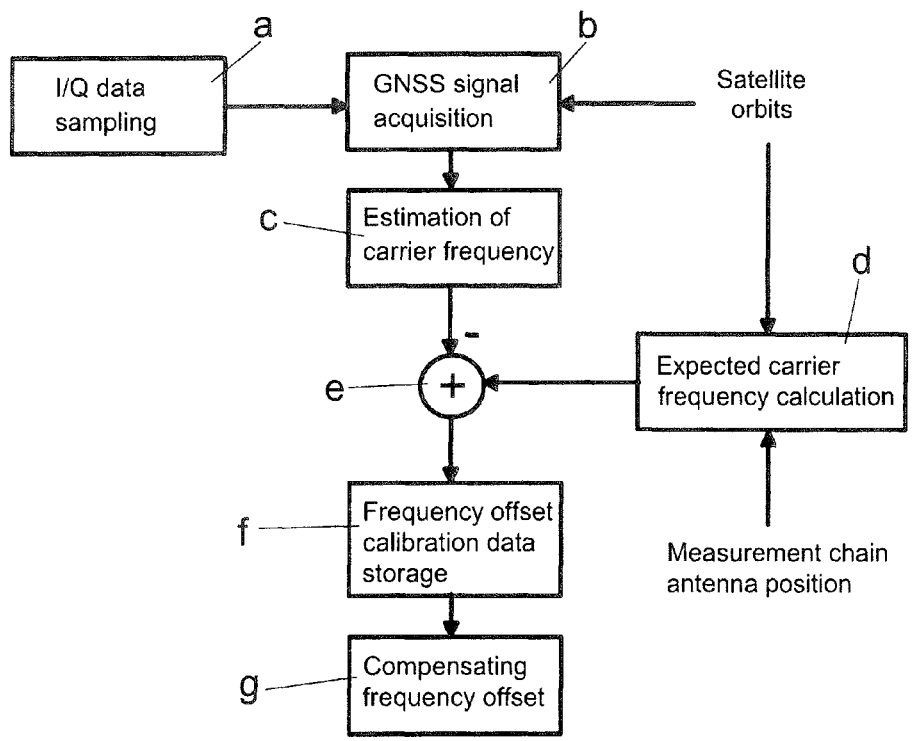
FIG. 2 illustrates a schematic visualization of the method according to the present invention.

A method for self-calibration of frequency offsets in the measurements provided by the measurement equipment works as follows (FIG. 2):

The first step (a) is to use the measurement equipment to sample I/Q data in a GNSS band, e.g. the L1-band. This I/Q data can be provided in baseband or on an intermediate frequency. The sample size and bandwidth must be large enough to allow for an acquisition of the GNSS signals contained in the selected band.

The second step (b) is to acquire one or more GNSS signals. In principle, this is done by correlating the I/Q samples with appropriate replica signals of different code phases and carrier frequencies. The highest correlation peak indicates the best agreement between the satellite signal and the respective replica signal, which reveals the satellite signal's code phase and carrier frequency. Basically, any common acquisition technique—sequential search, parallel code phase search, parallel frequency search to name a few—can be used that provides in a third step (c) an estimate of the satellite signal's carrier frequency. The satellite visibility is calculated from ephemeris or almanac data.

It is advantageous, but not required, to perform a coarse acquisition (sub-step b1) first, and then to refine the carrier frequency estimate (sub-step b2). This refinement can be achieved by again applying an acquisition technique but with narrowed frequency bins, or by processing the I/Q data in a tracking loop implementation initialized from the results of the coarse acquisition. The outcome of the third step (c) is an estimate of the carrier frequency of one or more GNSS signals received by the measurement equipment.

The expected GNSS signal carrier frequency is calculated in a fourth step (d) from the measurement chain antenna position, the satellite position and the satellite velocity.

In a fifth step (e), the expected satellite signal carrier frequency is compared with the estimate of the carrier frequency from the third step.

The difference between the expected and the estimated carrier frequency equals the frequency offset of the measurement equipment at the expected carrier frequency. With the knowledge of the measurement equipment's oscillator frequency—or by using signals from two or more GNSS bands—the frequency offset of the measurements provided by the measurement equipment can be calculated at any frequency of interest.

In a sixth step (f), the frequency offset obtained in the fifth step (e) is stored.

Step seven (g) completes the self-calibration procedure and allows to compensate the frequency offset of each future measurement.

The invention involves a method that allows for a self-calibration of the frequency offsets of an interference monitoring system measurement equipment.

The following advantages can be achieved with the present invention:

The self-calibration capability provided by this method avoids frequent site visits for calibration purposes, which reduces the system's downtime and is cost-efficient.

No additional dedicated hardware is required to implement this self-calibration capability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for self-calibration of frequency offsets in measurement equipment of an interference monitoring system, wherein the measurement equipment has a measurement antenna of a known position, the method comprising the steps of:
    a) sampling I/Q data using the interference monitoring system measurement equipment;
    b) acquiring a satellite navigation signal from the I/Q data by correlating the sampled I/Q data with replica signals of different code phases and different carrier frequencies;
    c) said acquisition of step b) providing an estimate of a carrier frequency of the satellite navigation signal of a satellite;
    d) calculating visibility of the satellite from ephemeris or almanac data and determining an expected carrier frequency of the satellite navigation signal from satellite orbit data and the known position of the measurement antenna;
    e) comparing the expected carrier frequency of the satellite navigation signal with the estimated carrier frequency of the satellite navigation signal and calculating a frequency offset value as the difference between the expected and estimated carrier frequencies of the satellite navigation signal;
    f) storing the frequency offset value in a memory; and
    g) using the stored frequency offset value to compensate the frequency offset of at least one subsequent measurement wherein steps a)-g) are performed in alphabetical order.

2. The method according to claim 1, wherein the satellite orbit data includes satellite position and satellite velocity.

3. The method according to claim 1, wherein the acquisition of the satellite navigation signals from the I/Q data is carried out in two sub-steps:
    b1) carrying out a coarse acquisition sub-step first; and
    b2) carrying out a refinement acquisition sub-step thereafter.

4. The method according to claim 3, wherein in the refinement acquisition sub-step an acquisition technique is applied with narrow frequency bins.

5. The method according to claim 3, wherein in the refinement acquisition sub-step the I/Q data sampled in step a) are processed in a tracking loop implementation initialized from results of the coarse acquisition in sub-step b1).

6. The method according to claim 1, wherein the frequency offset value is calculated at more than one frequency of interest.

7. Self-calibration device for calibrating frequency offsets in a measurement equipment of an interference monitoring system, wherein the measurement equipment has a measurement antenna of a known position, and wherein the device executes instructions stored on a non-transitory computer-readable medium causing the device to:
   a) sample I/Q data using the interference monitoring system measurement equipment;
   b) acquire a satellite navigation signal from the I/Q data by correlating the sampled I/Q data with replica signals of different code phases and different carrier frequencies;
   c) said acquisition of step b) providing an estimate of a carrier frequency of the satellite navigation signal of a satellite;
   d) calculate visibility of the satellite from ephemeris or almanac data and determining an expected carrier frequency of the satellite navigation signal from satellite orbit data and the known position of the measurement antenna;
   e) compare the expected carrier frequency of the satellite navigation signal with the estimated carrier frequency of the satellite navigation signal and calculate a frequency offset value as the difference between the expected and estimated carrier frequencies of the satellite navigation signal;
   f) store the frequency offset value in a memory; and
   g) use the stored frequency offset value to compensate the frequency offset of at least one subsequent measurement,
   wherein steps a)-g) are performed in alphabetical order.

8. The self-calibration device according to claim 7, wherein the satellite orbit data includes satellite position and satellite velocity.

9. The self-calibration device according to claim 7, wherein the acquisition of the satellite navigation signals from the I/Q data is carried out by first carrying out a coarse acquisition and subsequently carrying out a refinement acquisition.

10. The self-calibration device according to claim 9, wherein the refinement acquisition applies an acquisition technique with narrow frequency bins.

11. The self-calibration device according to claim 9, wherein in the refinement acquisition the sampled I/Q data are processed in a tracking loop implementation initialized from results of the coarse acquisition.

12. The self-calibration device according to claim 7, wherein the frequency offset value is calculated at more than one frequency of interest.

13. An interference monitoring system comprising measurement equipment provided with a self-calibrating device that executes instructions stored on a non-transitory computer-readable medium causing the device to:
   a) sample I/Q data using the interference monitoring system measurement equipment;
   b) acquire a satellite navigation signal from the I/Q data by correlating the sampled I/Q data with replica signals of different code phases and different carrier frequencies;
   c) said acquisition of step b) providing an estimate of a carrier frequency of the satellite navigation signal of a satellite;
   d) calculate visibility of the satellite from ephemeris or almanac data and determining an expected carrier frequency of the satellite navigation signal from satellite orbit data and the known position of the measurement antenna;
   e) compare the expected carrier frequency of the satellite navigation signal with the estimated carrier frequency of the satellite navigation signal and calculate a frequency offset value as the difference between the expected and estimated carrier frequencies of the satellite navigation signal;
   f) store the frequency offset value in a memory; and
   g) use the stored frequency offset value to compensate the frequency offset of at least one subsequent measurement,
   wherein steps a)-g) are performed in alphabetical order.

* * * * *